(12) United States Patent
Ryszka et al.

(10) Patent No.: US 11,556,827 B2
(45) Date of Patent: Jan. 17, 2023

(54) TRANSFERRING LARGE DATASETS BY USING DATA GENERALIZATION

(71) Applicant: International Business Machines Corporation, Armonk, NY (US)

(72) Inventors: Daniel Jakub Ryszka, Cracow (PL); Bartlomiej Tomasz Malecki, Slomniki (PL); Maria Hanna Oleszkiewicz, Modlniczka (PL); Blazej Rafal Rutkowski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 16/875,514

(22) Filed: May 15, 2020

(65) Prior Publication Data

US 2021/0357795 A1 Nov. 18, 2021

(51) Int. Cl.
*G06N 7/00* (2006.01)
*H04L 67/00* (2022.01)
(Continued)

(52) U.S. Cl.
CPC ........... *G06N 7/005* (2013.01); *G06K 9/6256* (2013.01); *G06K 9/6262* (2013.01); *G06N 3/0454* (2013.01); *H04L 67/34* (2013.01)

(58) Field of Classification Search
CPC ...... G06N 7/005; G06N 3/0454; G06N 20/00; G06N 3/0472; G06N 3/088; G06K 9/6256; G06K 9/6262; H04L 67/34

See application file for complete search history.

(56) References Cited

U.S. PATENT DOCUMENTS 4,363,036 A * 12/1982 Subramaniam ......... H03M 7/42
382/238
4,633,490 A * 12/1986 Goertzel ............. H03M 7/4006
358/1.9

(Continued)

FOREIGN PATENT DOCUMENTS

CN 101479697 A 7/2009

OTHER PUBLICATIONS

Nikam et al., "Big Data Transfers Using Recursive Chunk Division," International Research Journal of Engineering and Technology (IRJE 1), vol. 4, Issue 4, Apr. 2017, 8 pages.

(Continued)

*Primary Examiner* — Lewis G West
(74) *Attorney, Agent, or Firm* — Yee & Associates, P.C.

(57) ABSTRACT

A computer-implemented method for transferring data is provided. In an illustrative embodiment, the method includes retrieving, by a computer, an original dataset to be sent from a sender to a receiver. The method also includes generating, by the computer, a model based on at least a subset of the original dataset. The model generates a predicted dataset. The model is selected from a plurality of model types based on data complexity of the original dataset and a desired level of approximation of the predicted dataset to the original dataset. The method also includes transferring, by the computer, the model to the receiver. The receiver uses the model to generate the predicted dataset, wherein the predicted dataset matches the original dataset to a selected degree of approximation. Transfer of the model is quicker than transfer of the original dataset.

20 Claims, 4 Drawing Sheets

(51) Int. Cl.
  *G06K 9/62* (2022.01)
  *G06N 3/04* (2006.01)

(56) References Cited

U.S. PATENT DOCUMENTS

| | | | |
|---|---|---|---|
| 2002/0120797 A1* | 8/2002 | Fabre | G06F 13/124 |
| | | | 710/60 |
| 2019/0036999 A1* | 1/2019 | Champion | H04L 65/65 |
| 2020/0053577 A1* | 2/2020 | Sundar | H04W 4/44 |
| 2020/0244969 A1* | 7/2020 | Bhorkar | H04N 19/147 |
| 2020/0285983 A1* | 9/2020 | Bhattacharyya | G06F 16/1744 |

OTHER PUBLICATIONS

Allen et al., "Globus Online: Radical Simplification of Data Movement via SaaS," published 2011, 8 pages. https://www.globus.org/sites/default/files/globus-online-radical-simplification-of-data-movement-via-saas.pdf.

Liu et al., "GridFTP GUI: An Easy and Efficient Way to Transfer Data in Grid," Networks for Grid Applications: Third International ICST Conference, GridNets 2009, Athens, Greece, Sep. 8-9, 2009, 10 pages.

"Strategies for transferring big data sets," Google Cloud, updated Oct. 11, 2017, accessed Oct. 10, 2019, 14 pages. https://cloud.google.com/solutions/transferring-big-data-sets-to-gcp.

* cited by examiner

TRANSFERRING LARGE DATASETS BY USING DATA GENERALIZATION

BACKGROUND INFORMATION

1. Field

The present disclosure relates generally to an improved computer system and, in particular, to an improved system and method for data transfer.

2. Background

Enterprises increasingly utilize resources distributed around the globe. In fact, many enterprises may include teams geographical dispersed from each other. To facilitate working together, data files are often transferred between groups. Often times these data files are large and take significant amount of time to transfer even with high speed data transport connections. The time lags may reduce efficiency and cause down time for resources that cannot be utilized until the data arrives.

SUMMARY

An illustrative embodiment provides a computer-implemented method for transferring a dataset. The method includes retrieving, by a computer, an original dataset to be sent from a sender to a receiver. The method also includes generating, by the computer, a model based on at least a subset of the original dataset. The model generates a predicted dataset. The model is selected from a plurality of model types based on data complexity of the original dataset and a desired level of approximation of the predicted dataset to the original dataset. The method also includes transferring, by the computer, the model to the receiver. The receiver uses the model to generate the predicted dataset, wherein the predicted dataset matches the original dataset to a selected degree of approximation. Transfer of the model is quicker than transfer of the original dataset. According to other illustrative embodiments, a data processing system and computer program product for transferring datasets are provided.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments further recognize and take into account that transferring large data files sometimes takes significant time. The illustrative embodiments further recognize and take into account that this delay may delay other processing or use of the data. The illustrative embodiments further recognize and take into account that this delay in use of the data, may cascade causing significant downstream delays in other activities of an enterprise.

The illustrative embodiments provide methods, systems, and computer program products that improve the speed of the ability to utilize large datasets in receivers that are receiving the dataset over a network connection. The illustrative embodiments provide methods, systems, and computer program products that provide for modeling the data and sending the model to the receiver prior to the dataset. The model can be used to generate predicted data which the receiver can use in lieu of the original data. In illustrative embodiments, the original data may then be sent in parallel with the model or in other embodiments, it may not be necessary to actually transmit the original dataset. In some embodiments, once some of the original data is received by the receiver, the predicted data can be compared with the original data to determine its accuracy and if it is insufficiently accurate, the receiver may request that the sender generate a new model using different criteria in generating the new model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals perse, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
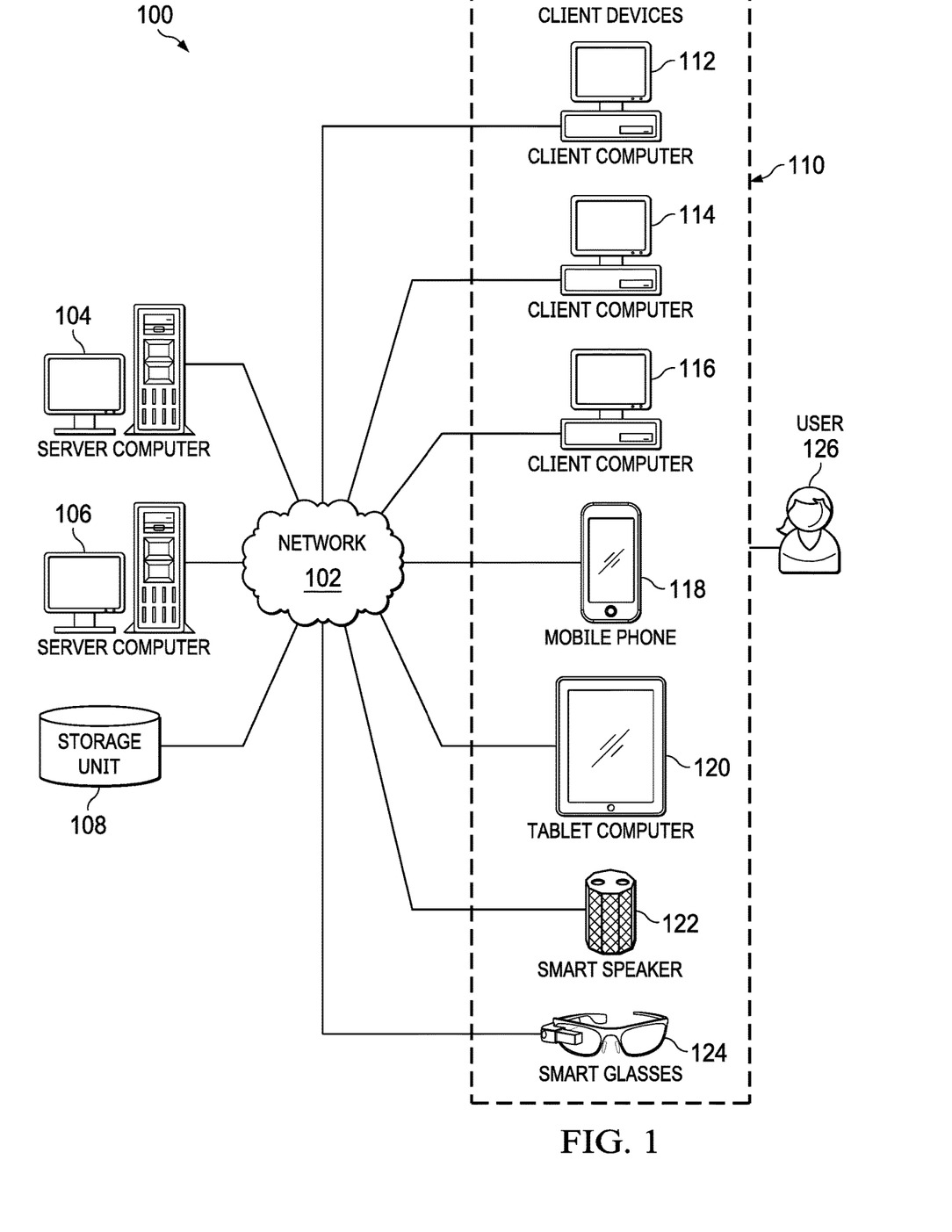
FIG. 1 is a block diagram of an information environment in accordance with an illustrative embodiment.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Further, client devices 110 can also include other types of client devices such mobile phone 118, tablet computer 120, smart speaker 122, and smart glasses 124. Client devices 110 can be, for example, computers, workstations, or network computers. In the depicted example, server computer 104 provides information, such as boot files, operating system images, and applications to client devices 110. In this illustrative example, server computer 104, server computer 106, storage unit 108, and client devices 110 are network devices that connect to network 102 in which network 102 is the communications media for these network devices.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). Network 102 may be comprised of the Internet-of-Things (IoT). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, structured data arranged into columns and rows is stored on storage unit 108. An analyzer on, for example, server computer 104 or client computer 112 analyzes the structured data to determine patterns in the data that may indicate that a column may be split into multiple statistically relevant columns. The analyzer may apply rules that indicate when a column should be split into multiple columns and rules that indicate that the column should not be split.

Figure 2:
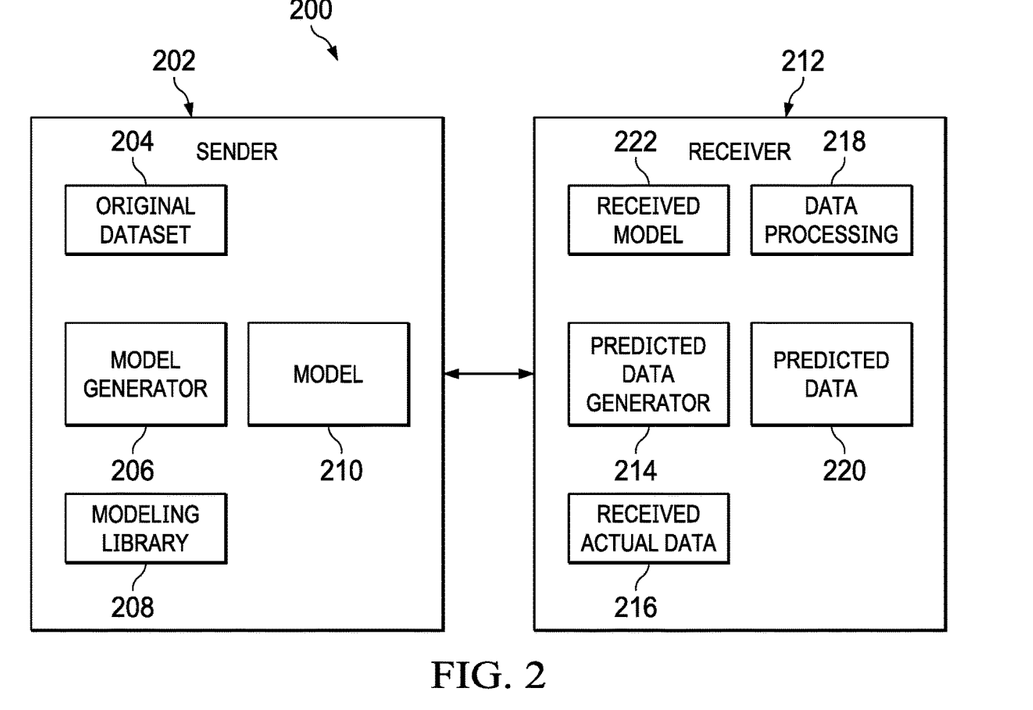
FIG. 2 is a block diagram of a system for efficient data transmission depicted in accordance with an illustrative embodiment.

Turning now to FIG. 2, a block diagram of a system for efficient data transmission is depicted in accordance with an illustrative embodiment. System 200 may be implemented within, for example, network data processing system 100 depicted in FIG. 1. System 200 includes a sender 202 and a receiver 212. Sender 202 and receiver 212 each may be implemented as, for example, any of server computers 104, 106 or one of client devices 110. Sender 202 includes an original dataset 204 that the sender desires to transmit to receiver 212. Dataset 204 may be a very large dataset that requires significant time and resources to transmit. In order to speed transmission and allow receiver 212 to begin manipulating or using the data in dataset 204 more quickly, sender 202 transmits a model 210 to receiver 212. Model 210 is generated by model generator 206 using at least a subset of the original dataset to generate a model 210 that can be used to generate the data to within at least an approximation where the approximation is within a predetermined threshold of accuracy. For example, the threshold approximation may be that the modeled data is correct to 95% accuracy. The threshold accuracy may vary depending on implementation and the requirements of the receiver as far as how the data in the original dataset 204 is to be used. The model generator may select a particular model type from modeling library 208 to use to generate the model 210. Types of models contained in the modeling library 208 include a multinomial distribution, a derivative of a multinomial distribution, and a best fitting continuous multivariate distribution model. Model generator 206 may also generate a model using machine learning, such as using a generative adversarial network (GAN) that is trained with at least a subset of the original data, wherein the GAN model determined includes input and output dimensions, a number of layers, a number of neurons in each layer, and connection weighs between neurons.

Model generator 206 may use a variety of criteria in determining a model to use to predict the data in the original dataset 204. The criteria may include the type of data in the original dataset 204, the accuracy needed in the predicted data, the size and ease of computation of the resulting model 210, as well as other factors. For example, in some embodiments, a multinomial distribution or a derivative of a multinomial distribution is used to generate a discrete model 210 when the original dataset 204 is categorical or can be transformed into a categorical representation without losing more than a threshold amount of information. As another example, when the original dataset 204 is continuous and components of the original dataset 204 cannot be transformed into a categorical representation, a best fitting continuous multivariate distribution model 210 is generated using statistical modeling, the best fitting continuous multivariate distribution model 210 including a type of distribution and the parameters describing the distribution. As another example, when the original dataset 204 comprises unstructured data or machine learning is desired to fit the model 210, a generative adversarial network (GAN) is trained with at least a subset of the original dataset 204, wherein after training, a GAN model 210 is determined, the GAN model 210 includes input and output dimensions, a number of layers, a number of neurons in each layer, and connection weights between neurons.

Once a model 210 has been generated by model generator 206, the sender 202 sends the model, which includes all of the parameters necessary to specify the model, to the receiver 212. The receiver stores model 210 as the received model 222 and a predicted data generator 214 uses the received model 222 to generated predicted data 220. The predicted data 220 may then be used for analysis, data processing 218, or any other purpose for which the original dataset 204 would have been used for. This allows the receiver 212 to more quickly begin processing the data and obtaining results or using the data as necessary without having to wait for the additional time necessary for the original dataset 204 to be transmitted.

After the model 210 is sent to the receiver 212 or simultaneously with transmitting the model 210, the sender may begin transmitting the original dataset 204 to the receiver 212. Depending on implementation, it may not be necessary to transmit the original dataset 204 as the predicted data 220 generated by the model 210 may be sufficiently accurate for the needs of the receiver 212. However, in some circumstances, it is desirable to transmit the original dataset 204 even though a model 210 has been transmitted. When the receiver 212 begins receiving the original dataset 204, the data is stored as received actual data 216. The receiver 212 may compare some subset of the predicted data 220 with a corresponding subset of the received actual data 216. If the predicted data 220 differs from the received actual data 216 by more than some threshold value, then the receiver 212 may send the sender 202 a notice indicating such and may request that the sender 202 generate a new model 210 and transmit the new model t the receiver 212. Upon receiving such a request, the model generator 206 will regenerate an updated model using at least one of a different method of model generation, a different criteria for selecting a model type from the plurality of model types, and/or a different subset of the original data. Once the new model 210 is generated, the sender 202 sends the new model to the receiver 212. The receiver 212 may then use the new model to generate predicted data 220. A subset of this new predicted data 220 may also be compared to the corresponding subset of the received actual data 216 to determine how accurate the model is. If the predicted data 220 is still not sufficiently accurate, the receiver 212 may again send a request to the sender 202. This process may be repeated as often as necessary. In some cases, the size of the original dataset 204 is so large that several models may be generated and transmitted and the predicted data 220 resulting from each model 210 compared to the received actual data 216 more quickly than the time it takes for all of the original dataset 204 to be transferred.

Figure 3:
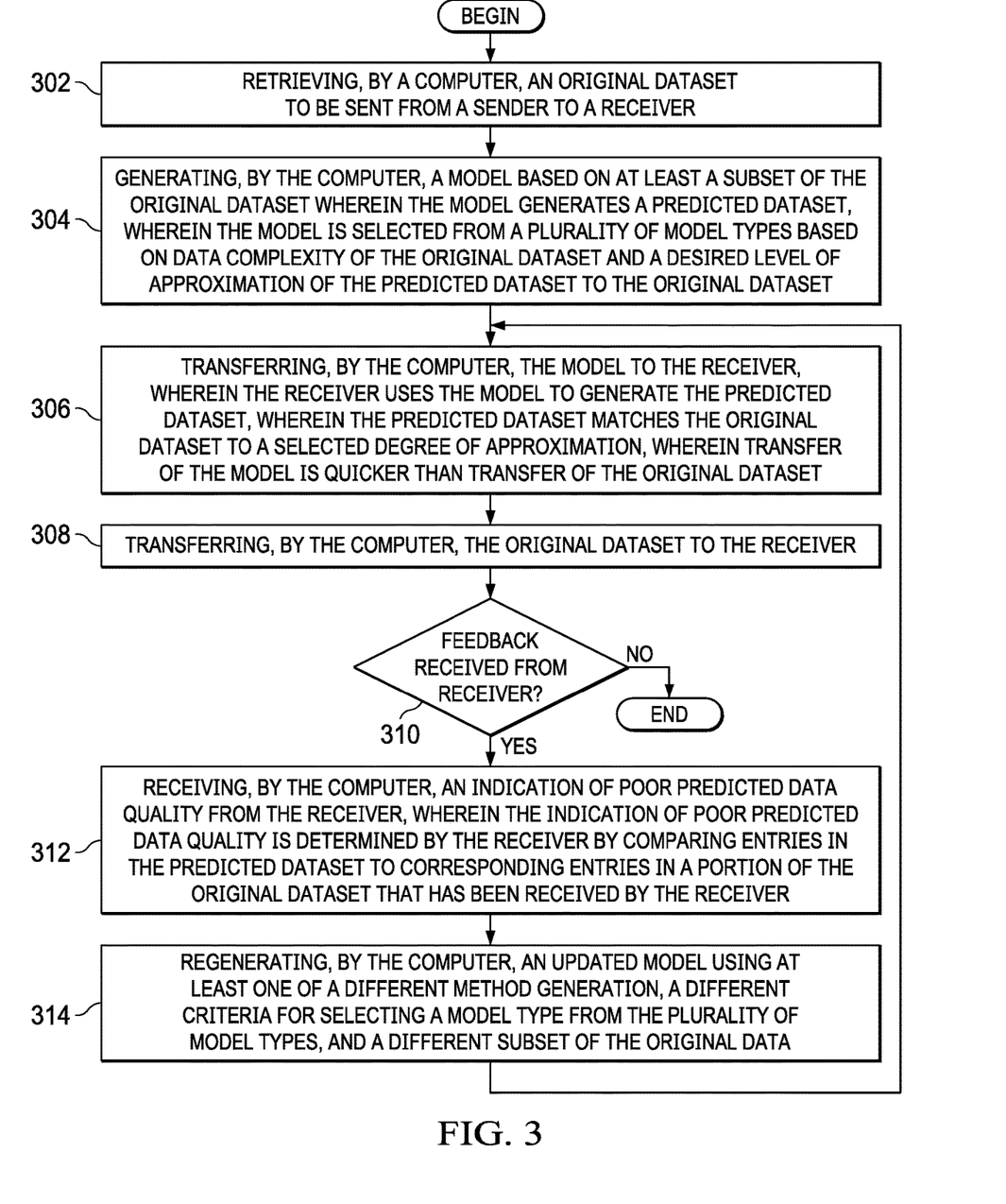
FIG. 3 is a flowchart of a method for transmitting data depicted in accordance with an illustrative embodiment.

Turning now to FIG. 3, a flowchart of a method for transmitting data is depicted in accordance with an illustrative embodiment. Method 300 is an example of a method that can be executed by system 200 or on network data processing system 100. Method 300 begins by retrieving, by a computer, an original dataset to be sent from a sender to a receiver (step 302). Next, the method 300 continues by generating, by the computer, a model based on at least a subset of the original dataset wherein the model generates a predicted dataset, wherein the model is selected from a plurality of model types based on data complexity of the original dataset and a desired level of approximation of the predicted dataset to the original dataset (step 304). Next, the method 300 continues by transferring, by the computer, the model to the receiver, wherein the receiver uses the model to generate the predicted dataset, wherein the predicted dataset matches the original dataset to a selected degree of approximation, wherein transfer of the model is quicker than transfer of the original dataset (step 306). In some embodiments, in parallel with step 306 or after step 306, the method 300 continues by Transferring, by the computer, the original dataset to the receiver (step 308). Next, the method 300 continues by determining whether feedback has been received from the receiver (step 310). If no feedback is received, the method may end. If feedback is received, then the method 300 continues by receiving, by the computer, an indication of poor predicted data quality from the receiver, wherein the indication of poor predicted data quality is determined by the receiver by comparing entries in the predicted dataset to corresponding entries in a portion of the original dataset that has been received by the receiver (step 312). Next, the method 300 continues by regenerating, by the computer, an updated model using at least one of a different method generation, a different criteria for selecting a model type from the plurality of model types, and a different subset of the original data (step 314).

Figure 4:
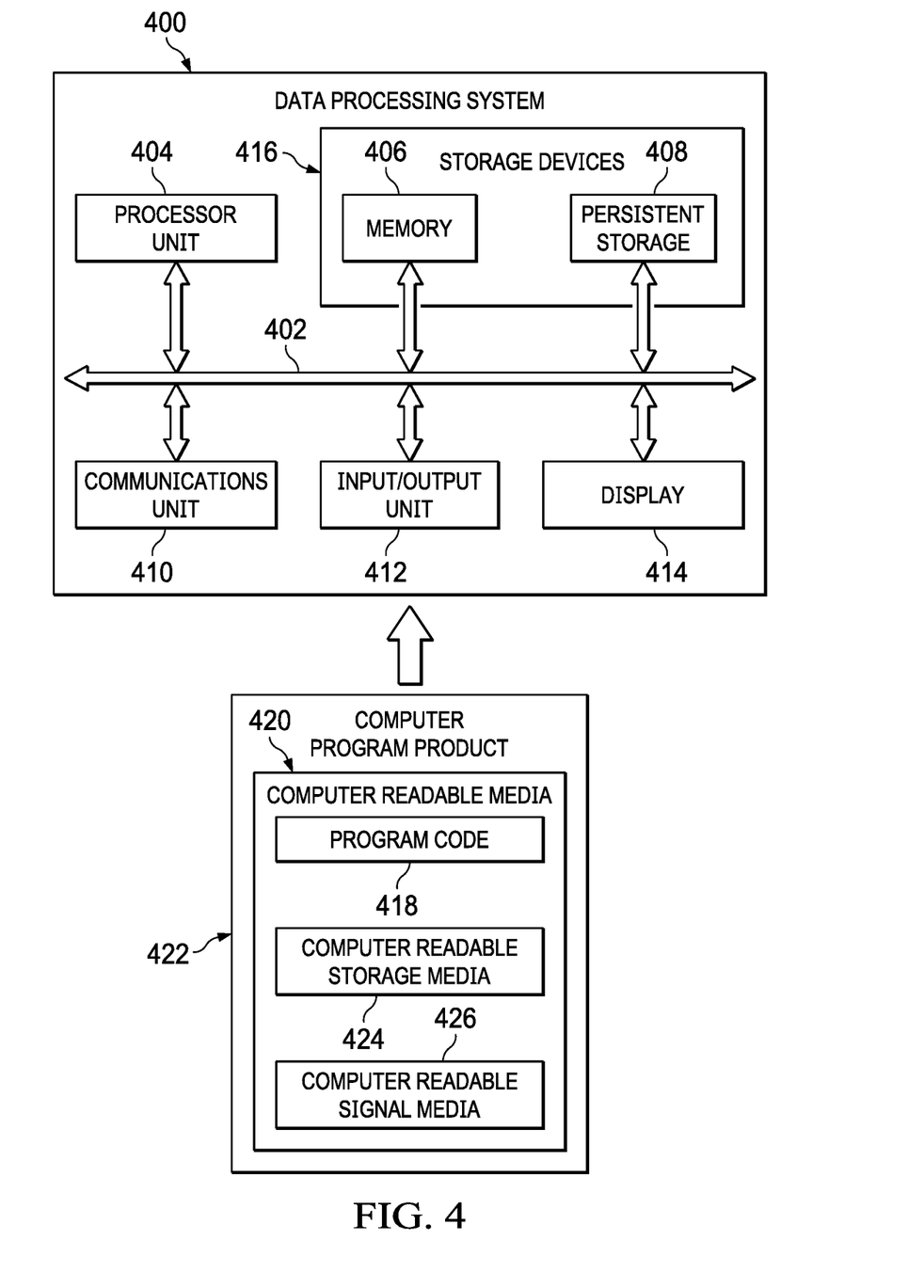
FIG. 4 is a block diagram of a data processing system in accordance with an illustrative embodiment.

Turning now to FIG. 4, an illustration of a block diagram of a data processing system is depicted in accordance with an illustrative embodiment. Data processing system 400 may be used to implement one or more computers and clients in computer system 40 in FIG. 1. In this illustrative example, data processing system 400 includes communications framework 402, which provides communications between processor unit 404, memory 406, persistent storage 408, communications unit 410, input/output unit 412, and display 414. In this example, communications framework 402 may take the form of a bus system.

Processor unit 404 serves to execute instructions for software that may be loaded into memory 406. Processor unit 404 may be a number of processors, a multi-processor core, or some other type of processor, depending on the particular implementation. In an embodiment, processor unit 404 comprises one or more conventional general purpose central processing units (CPUs). In an alternate embodiment, processor unit 404 comprises one or more graphical processing units (CPUs).

Memory 406 and persistent storage 408 are examples of storage devices 416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 416 may also be referred to as computer-readable storage devices in these illustrative examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408. Communications unit 410, in these illustrative examples, provides for communications with other data processing systems or devices. In these illustrative examples, communications unit 410 is a network interface card.

Input/output unit 412 allows for input and output of data with other devices that may be connected to data processing system 400. For example, input/output unit 412 may provide a connection for user input through at least one of a keyboard, a mouse, or some other suitable input device. Further, input/output unit 412 may send output to a printer. Display 414 provides a mechanism to display information to a user.

Instructions for at least one of the operating system, applications, or programs may be located in storage devices 416, which are in communication with processor unit 404 through communications framework 402. The processes of the different embodiments may be performed by processor unit 404 using computer-implemented instructions, which may be located in a memory, such as memory 406.

These instructions are referred to as program code, computer-usable program code, or computer-readable program code that may be read and executed by a processor in processor unit 404. The program code in the different embodiments may be embodied on different physical or computer-readable storage media, such as memory 406 or persistent storage 408.

Program code 418 is located in a functional form on computer-readable media 420 that is selectively removable and may be loaded onto or transferred to data processing system 400 for execution by processor unit 404. Program code 418 and computer-readable media 420 form computer program product 422 in these illustrative examples. In one example, computer-readable media 420 may be computer-readable storage media 424 or computer-readable signal media 426.

In these illustrative examples, computer-readable storage media 424 is a physical or tangible storage device used to store program code 418 rather than a medium that propagates or transmits program code 418. Alternatively, program code 418 may be transferred to data processing system 400 using computer-readable signal media 426.

Computer-readable signal media 426 may be, for example, a propagated data signal containing program code 418. For example, computer-readable signal media 426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

Further, as used herein, "computer-readable media 420" can be singular or plural. For example, program code 418 can be located in computer-readable media 420 in the form of a single storage device or system. In another example, program code 418 can be located in computer-readable media 420 that is distributed in multiple data processing systems. In other words, some instructions in program code 418 can be located in one data processing system while other instructions in in program code 418 can be located in one data processing system. For example, a portion of program code 418 can be located in computer-readable media 420 in a server computer while another portion of program code 418 can be located in computer-readable media 420 located in a set of client computers.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code 418.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for transferring data, comprising:
retrieving, by a computer, an original dataset to be sent from a sender to a receiver;
generating, by the computer, a model based on at least a subset of the original dataset wherein the model generates a predicted dataset, wherein the model is selected from a plurality of model types based on data complexity of the original dataset and a desired level of approximation of the predicted dataset to the original dataset; and
transferring, by the computer, the model to the receiver, wherein the receiver uses the model to generate the predicted dataset, wherein the predicted dataset matches the original dataset to a selected degree of approximation, wherein transfer of the model is quicker than transfer of the original dataset.

2. The method of claim 1, further comprising:
transferring, by the computer, the original dataset to the receiver.

3. The method of claim 2, further comprising:
receiving, by the computer, an indication of poor predicted data quality from the receiver, wherein the indication of poor predicted data quality is determined by the receiver by comparing entries in the predicted dataset to corresponding entries in a portion of the original dataset that has been received by the receiver.

4. The method of claim 3, further comprising:
regenerating, by the computer, an updated model using at least one of a different method generation, a different criteria for selecting a model type from the plurality of model types, and a different subset of the original data.

5. The method of claim 1, wherein the receiver uses the predicted dataset generated by the model to begin processing steps intended to be performed on the original dataset.

6. The method of claim 1, wherein a multinomial distribution or a derivative of a multinomial distribution is used to generate a discrete model when the original dataset is categorical or can be transformed into a categorical representation without losing more than a threshold amount of information.

7. The method of claim 1, wherein when the original data set is continuous and components of the original dataset cannot be transformed into a categorical representation, a best fitting continuous multivariate distribution model is generated using statistical modeling, the best fitting continuous multivariate distribution model comprising a type of distribution and the parameters describing the distribution.

8. The method of claim 1, wherein, when the original dataset comprises unstructured data or machine learning is desired to fit the model, a generative adversarial network (GAN) is trained with at least a subset of the original dataset, wherein after training, a GAN model is determined, the GAN model comprising input and output dimensions, a number of layers, a number of neurons in each layer, and connection weights between neurons.

9. A computer system for transferring data, the computer system comprising:
- a bus system;
- a storage device connected to the bus system, wherein the storage device stores program instructions; and
- a processor connected to the bus system, wherein the processor executes the program instructions to:
- retrieve an original dataset to be sent from a sender to a receiver;
- generate a model based on at least a subset of the original dataset wherein the model generates a predicted dataset, wherein the model is selected from a plurality of model types based on data complexity of the original dataset and a desired level of approximation of the predicted dataset to the original dataset; and
- transfer the model to the receiver, wherein the receiver uses the model to generate the predicted dataset, wherein the predicted dataset matches the original dataset to a selected degree of approximation, wherein transfer of the model is quicker than transfer of the original dataset.

10. The computer system of claim 9, wherein the processor further executes the program instructions to:
- transfer the original dataset to the receiver.

11. The computer system of claim 10, wherein the processor further executes the program instructions to:
- receive an indication of poor predicted data quality from the receiver, wherein the indication of poor predicted data quality is determined by the receiver by comparing entries in the predicted dataset to corresponding entries in a portion of the original dataset that has been received by the receiver.

12. The computer system of claim 11, wherein the processor further executes the program instructions to:
- regenerate an updated model using at least one of a different method generation, a different criteria for selecting a model type from the plurality of model types, and a different subset of the original data.

13. The computer system of claim 9, wherein the receiver uses the predicted dataset generated by the model to begin processing steps intended to be performed on the original dataset.

14. The computer system of claim 9, wherein a multinomial distribution or a derivative of a multinomial distribution is used to generate a discrete model when the original dataset is categorical or can be transformed into a categorical representation without losing more than a threshold amount of information.

15. The computer system of claim 9, wherein when the original data set is continuous and components of the original dataset cannot be transformed into a categorical representation, a best fitting continuous multivariate distribution model is generated using statistical modeling, the best fitting continuous multivariate distribution model comprising a type of distribution and the parameters describing the distribution.

16. The computer system of claim 9, wherein, when the original dataset comprises unstructured data or machine learning is desired to fit the model, a generative adversarial network (GAN) is trained with at least a subset of the original dataset, wherein after training, a GAN model is determined, the GAN model comprising input and output dimensions, a number of layers, a number of neurons in each layer, and connection weights between neurons.

17. A computer program product for transferring data, the computer program product comprising a computer readable storage medium having program instructions embodied therewith, the program instructions executable by a computer to cause the computer to perform a method comprising:
- retrieving, by a computer, an original dataset to be sent from a sender to a receiver;
- generating, by the computer, a model based on at least a subset of the original dataset wherein the model generates a predicted dataset, wherein the model is selected from a plurality of model types based on data complexity of the original dataset and a desired level of approximation of the predicted dataset to the original dataset; and
- transferring, by the computer, the model to the receiver, wherein the receiver uses the model to generate the predicted dataset, wherein the predicted dataset matches the original dataset to a selected degree of approximation, wherein transfer of the model is quicker than transfer of the original dataset.

18. The computer program product of claim 17, wherein a multinomial distribution or a derivative of a multinomial distribution is used to generate a discrete model when the original dataset is categorical or can be transformed into a categorical representation without losing more than a threshold amount of information.

19. The computer program product of claim 17, wherein when the original data set is continuous and components of the original dataset cannot be transformed into a categorical representation, a best fitting continuous multivariate distribution model is generated using statistical modeling, the best fitting continuous multivariate distribution model comprising a type of distribution and the parameters describing the distribution.

20. The computer program product of claim 17, wherein, when the original dataset comprises unstructured data or machine learning is desired to fit the model, a generative adversarial network (GAN) is trained with at least a subset of the original dataset, wherein after training, a GAN model is determined, the GAN model comprising input and output dimensions, a number of layers, a number of neurons in each layer, and connection weights between neurons.

* * * * *